(12) United States Patent
Inoue

(10) Patent No.: US 9,882,991 B2
(45) Date of Patent: Jan. 30, 2018

(54) URL ISSUING DEVICE, URL ISSUING METHOD, AND URL ISSUING PROGRAM

(71) Applicant: Rakuten, Inc., Tokyo (JP)

(72) Inventor: Eido Inoue, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 182 days.

(21) Appl. No.: 14/766,470

(22) PCT Filed: Sep. 30, 2013

(86) PCT No.: PCT/JP2013/076578
§ 371 (c)(1),
(2) Date: Aug. 7, 2015

(87) PCT Pub. No.: WO2015/045166
PCT Pub. Date: Apr. 2, 2015

(65) Prior Publication Data
US 2016/0182649 A1    Jun. 23, 2016

(51) Int. Cl.
*G06F 13/00* (2006.01)
*H04L 29/08* (2006.01)
(Continued)

(52) U.S. Cl.
CPC .......... *H04L 67/146* (2013.01); *G06F 13/385* (2013.01); *G06F 17/30887* (2013.01)

(58) Field of Classification Search
CPC ............. G06F 13/385; G06F 17/30887; H04L 67/146; H04L 63/108; H04L 9/3228
(Continued)

(56) References Cited

U.S. PATENT DOCUMENTS 6,701,317 B1 *   3/2004  Wiener ............... G06F 17/3061
9,479,607 B2 *  10/2016  Hasuo ................. H04L 67/2842
(Continued)

FOREIGN PATENT DOCUMENTS

JP    2004-30189 A      1/2004
JP    2007-310730 A    11/2007
(Continued)

OTHER PUBLICATIONS

Communication dated Dec. 17, 2013 from the International Searching Authority in counterpart International Application No. PCT/JP2013/076578.
(Continued)

*Primary Examiner* — Kenneth R Coulter
(74) *Attorney, Agent, or Firm* — Sughrue Mion, PLLC

(57) ABSTRACT

A URL issuing device includes a generation means configured to generate a URL containing information indicating a location of information to be accessed by one or more target users on a network, an accessible period during which the information is accessible being set to the URL, a notification means configured to notify the URL generated by the generation means to the target user, and a control means configured to control the generation means to update the generated URL to a URL composed of a different letter string from the generated URL and control the notification means to notify the updated URL to the target user when the accessible period has elapsed before a specified condition for stopping update of the URL is satisfied.

9 Claims, 10 Drawing Sheets (a)

| URL | ACCESSIBLE PERIOD | UPDATE STOP CONDITION | REQUEST USER | TARGET USER |
|---|---|---|---|---|
| ⋮ | ⋮ | ⋮ | ⋮ | ⋮ |
| http://AAA | ONE DAY | C1 | USER X | USER Y₁ |
| ⋮ | ⋮ | ⋮ | ⋮ | ⋮ |

(b)

| | UPDATE STOP CONDITION |
|---|---|
| C1 | UNTIL THERE IS ACCESS TO URL |

(51) Int. Cl.
*G06F 13/38* (2006.01)
*G06F 17/30* (2006.01)
(58) Field of Classification Search
USPC .......................................... 709/245, 217–219
See application file for complete search history.

(56) References Cited

U.S. PATENT DOCUMENTS

| 2005/0033745 | A1* | 2/2005 | Wiener | G06F 17/3061 |
| 2012/0066277 | A1 | 3/2012 | Ubukata et al. | |
| 2013/0262696 | A1* | 10/2013 | Watanabe | H04L 45/00 |
| | | | | 709/238 |
| 2014/0082123 | A1* | 3/2014 | Hasuo | H04L 67/2842 |
| | | | | 709/213 |

FOREIGN PATENT DOCUMENTS

| JP | 2008-140040 A | 6/2008 |
| JP | 2009-20739 A | 1/2009 |
| JP | 2012-63846 A | 3/2012 |

OTHER PUBLICATIONS

International Preliminary Report on Patentability for PCT/JP2013/076578 dated Apr. 14, 2016.

* cited by examiner

| URL | ACCESSIBLE PERIOD | UPDATE STOP CONDITION | REQUEST USER | TARGET USER |
|---|---|---|---|---|
| ... | ... | ... | ... | ... |
| http://AAA | ONE DAY | C1 | USER X | USER YA |
| ... | ... | ... | ... | ... |

(b)

| UPDATE STOP CONDITION | |
|---|---|
| C1 | UNTIL THERE IS ACCESS TO URL |

| URL | ACCESSIBLE PERIOD | UPDATE STOP CONDITION | REQUEST USER | TARGET USER |
|---|---|---|---|---|
| ... | ... | ... | ... | ... |
| http://BBB | TWO DAYS | C2 | USER X | USER YA |
| | | | | USER YB |
| | | | | USER YC |
| ... | ... | ... | ... | ... |

(b)

| UPDATE STOP CONDITION | |
|---|---|
| C2 | UNTIL UPDATE STOP INSTRUCTION IS RECEIVED FROM USER X |

Fig. 8

| URL | ACCESSIBLE PERIOD | UPDATE STOP CONDITION | REQUEST USER | TARGET USER |
|---|---|---|---|---|
| ... | ... | ... | ... | ... |
| 1. (SHORT URL) | 12 HOURS | | | USER Y$_A$ |
| 2. (INTERMEDIATE URL) | 24 HOURS | C4 | USER X | USER Y$_B$ |
| 3. (LONG URL) | 36 HOURS | | | USER Y$_C$ |
| ... | ... | ... | ... | ... |

URL ISSUING DEVICE, URL ISSUING METHOD, AND URL ISSUING PROGRAM

CROSS REFERENCE TO RELATED APPLICATIONS

This application is a National Stage of International Application No. PCT/JP2013/076578 filed Sep. 30, 2013, the contents of which are incorporated herein by reference in their entirety.

TECHNICAL FIELD

The present invention relates to a URL issuing device, a URL issuing method, and a URL issuing program.

BACKGROUND ART

As a framework for sharing a resource such as a file of one user placed on a network with another user, there is a technique that allows access to the resource by input of ID and password. Further, in view of the concern that input of ID and password is bothersome, a technique that generates a so-called one-time URL allowing access to a resource and issues the generated one-time URL to another user with whom the resource is to be shared is known (for example, see Patent Literature 1).

CITATION LIST

Patent Literature

PTL 1: Japanese Unexamined Patent Application Publication No. 2004-30189

SUMMARY OF INVENTION

Technical Problem

According to the related art, there is a risk that, when it takes a long time from issuance of a one-time URL allowing access to a resource to access to the URL by a target user with whom the resource is to be shared, the resource is accessed by unspecified users other than the target user.

In view of the above, an object of the present invention is to, when sharing a resource by issuance of a URL, reduce the possibility that the resource is accessed by a user other than a target user with whom the resource is to be shared.

Solution to Problem

To solve the above problem, a URL issuing device according to one aspect of the present invention includes a generation means configured to generate a URL containing information indicating a location of information to be accessed by one or more target users on a network, an accessible period during which the information is accessible being set to the URL, a notification means configured to notify the URL generated by the generation means to the target user, and a control means configured to control the generation means to update the generated URL to a URL composed of a different letter string from the generated URL and control the notification means to notify the updated URL to the target user when the accessible period has elapsed before a specified condition for stopping update of the URL is satisfied.

A URL issuing method according to one aspect of the present invention is a URL issuing method in a URL issuing device that issues a URL, the method including a generation step of generating a URL containing information indicating a location of information to be accessed by one or more target users on a network, an accessible period during which the information is accessible being set to the URL, a notification step of notifying the URL generated in the generation step to the target user, and a control step of repeating an update step of updating the generated URL to a URL composed of a different letter string from the generated URL and a notification step of notifying the URL updated in the update step to the target user when the accessible period has elapsed before a specified condition for stopping update of the URL is satisfied.

A URL issuing program according to one aspect of the present invention causes a computer to implement a generation function to generate a URL containing information indicating a location of information to be accessed by one or more target users on a network, an accessible period during which the information is accessible being set to the URL, a notification function to notify the URL generated by the generation function to the target user, and a control function to control the generation function to update the generated URL to a URL composed of a different letter string from the generated URL and control the notification function to notify the updated URL to the target user when the accessible period has elapsed before a specified condition for stopping update of the URL is satisfied.

According to the above aspect, a URL allowing access to information to be accessed by a target user is updated to a URL which is different from a URL that has been already generated, and the updated URL is notified to the target user until a specified condition is satisfied, and therefore, by extending the period during which the target user can make access by update and re-notification of the URL and limiting the period during which access can be made with the same URL to a certain period, it is possible to reduce the possibility of access by other unspecified users. Further, each time the URL is updated, the updated URL is notified to the target user, and therefore it is possible to prompt the target user to access the URL.

A URL issuing device according to another aspect may further include a receiving means configured to receive a specification of a resource to be shared with the target user from one user, and the generation means may generate a URL containing information indicating a location of the resource on a network.

According to the above aspect, a URL allowing access to a resource to be shared is updated to a URL which is different from a URL that has been already generated, and the updated URL is notified to a target user until a specified condition is satisfied, and therefore, by extending the period during which the target user can make access by update and re-notification of the URL and limiting the period during which access can be made with the same URL to a certain period, it is possible to reduce the possibility that the resource to be shared is accessed by other unspecified users. Further, each time the URL is updated, the updated URL is notified to the target user, and therefore it is possible to prompt the target user to access the resource to be shared.

In a URL issuing device according to another aspect, the specified condition may be receiving of an instruction indicating stop of URL update and notification from the one user.

According to the above aspect, it is possible to share the resource with the target user while reducing the possibility that the resource is accessed by other unspecified users until one user determines that it is no longer necessary to share the resource with the target user.

In a URL issuing device according to another aspect, the specified condition may be detection of access to the notified URL by the target user.

According to the above aspect, update of a URL and notification to a target user are repeated until access to the notified URL by the target user is detected, and it is possible to allow the target user to access the resource without fail.

In a URL issuing device according to another aspect, the specified condition may be update of the URL a specified number of times.

According to the above aspect, update of a URL and notification to a target user are repeated until the URL is updated a specified number of times, and it is thereby possible to extend the period during which the target user can make access while reducing the possibility of access by other unspecified users and prompting the target user to access the URL.

In a URL issuing device according to another aspect, the specified condition may be detection of access to the notified URL by users exceeding the number of target users.

When access from users exceeding the number of target users is detected, it is highly probable that access to the URL is made by users other than the target user. According to the above aspect, because update of a URL and notification to a target user are repeated until such access is detected, it is possible to reduce the possibility of access by other unspecified users.

In a URL issuing device according to another aspect, when updating a URL, the generation means may generate a URL composed of a longer letter string than a URL before update and having a longer accessible period than the URL before update.

As a letter string of a URL is longer, the possibility that it is recognized by other unspecified users, search engine robots and the like is reduced. According to the above aspect, in the update of a URL, a URL composed of a longer letter string than before update is generated, and therefore an increase in the risk of access by other unspecified users caused by an increase in the period during which the resource is accessible with the same URL can be cancelled out by the longer letter string of the URL. Accordingly, because the number of times of notifying a URL can be reduced while preventing an increase in the risk of access by other unspecified users, it is possible to save the target user from the bothersome task of receiving the URL.

In a URL issuing device according to another aspect, when the specified condition is satisfied, the control means may perform control to invalidate the URL notified last time by the notification means so as to disable access to the information.

According to the above aspect, because it is controlled to disable access to a resource to be shared when the specified condition to stop update of a URL is satisfied, it is possible to reliably reduce the risk of access by other unspecified users.

Advantageous Effects of Invention

According to one aspect of the present invention, when sharing a resource by issuance of a URL, it is possible to reduce the possibility that the resource is accessed by a user other than a target user with whom the resource is to be shared.

BRIEF DESCRIPTION OF DRAWINGS

FIG. 4 is a view schematically showing a configuration of a URL information storage unit and an example of data stored therein.

FIG. 5 is a view schematically showing a configuration of the URL information storage unit and an example of data stored therein.

FIG. 8 is a view showing an example of data set to the URL information storage unit in the case of generating the URL shown in FIG. 7.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

Figure 1:
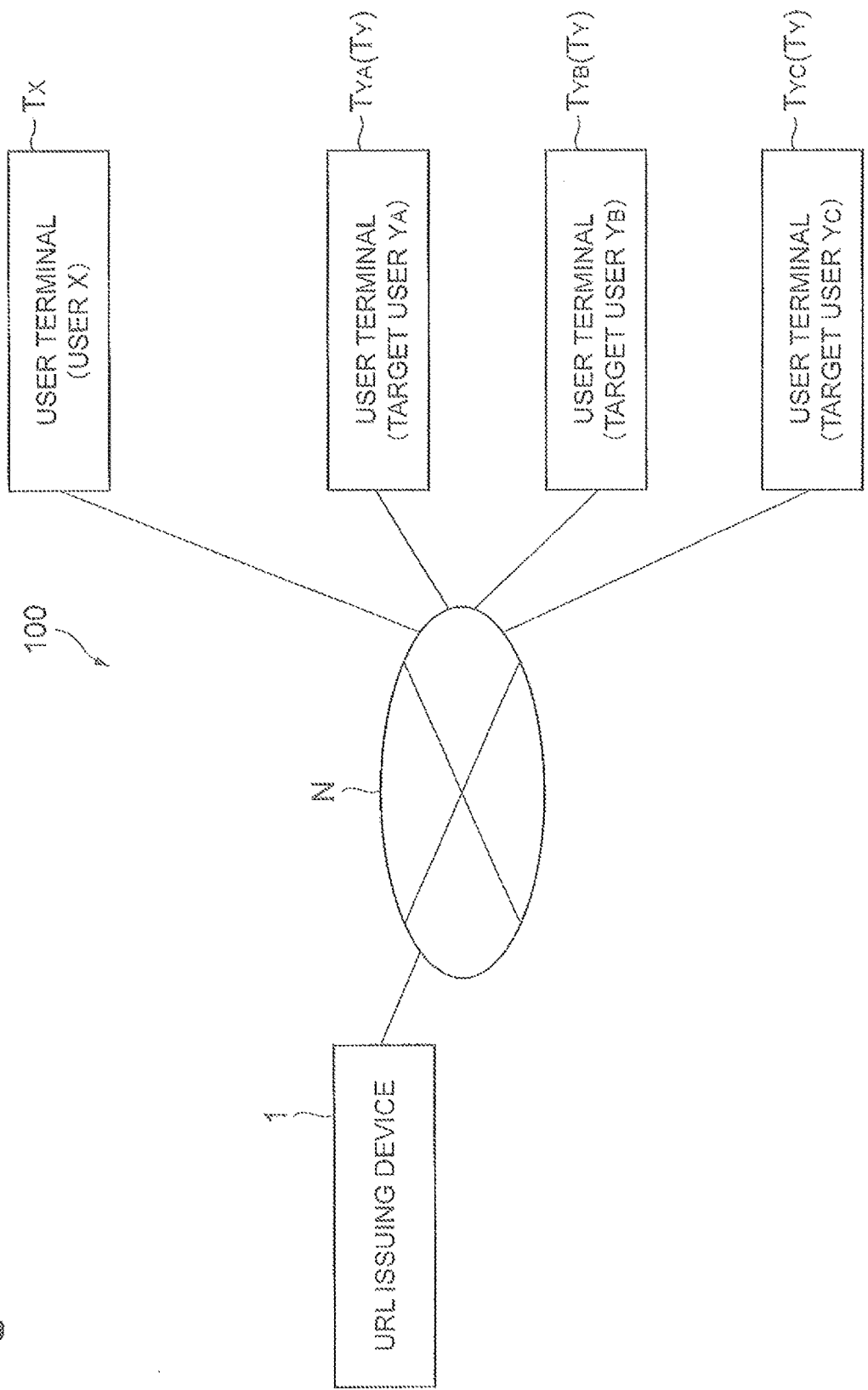
FIG. 1 is a view showing a configuration of a system including a URL issuing device.

FIG. 1 is a view showing a configuration of a URL issuing system 100 that includes a URL issuing device 1 according to this embodiment. As shown in FIG. 1, the URL issuing system 100 includes the URL issuing device 1, a user terminal $T_X$ of a user X, and user terminals $T_{YA}$, $T_{YB}$ and $T_{YC}$ of target users $Y_A$, $Y_B$ and $Y_C$. The user terminals $T_X$ and $T_Y$ and the URL issuing device 1 are connected through a network N such as the Internet. The user X in this embodiment is a user who shares a resource with a target user Y and who is the owner of the resource, for example.

Note that, although three user terminals $T_Y$ are shown in FIG. 1, the number of user terminals $T_Y$ is not limited. The variety of the user terminals $T_X$ and $T_Y$ is not particularly limited, and it may be a stationary or portable personal computer, or a mobile terminal such as an advanced mobile phone (smart phone), a cellular phone or a personal digital assistant (PDA), for example.

Figure 2:
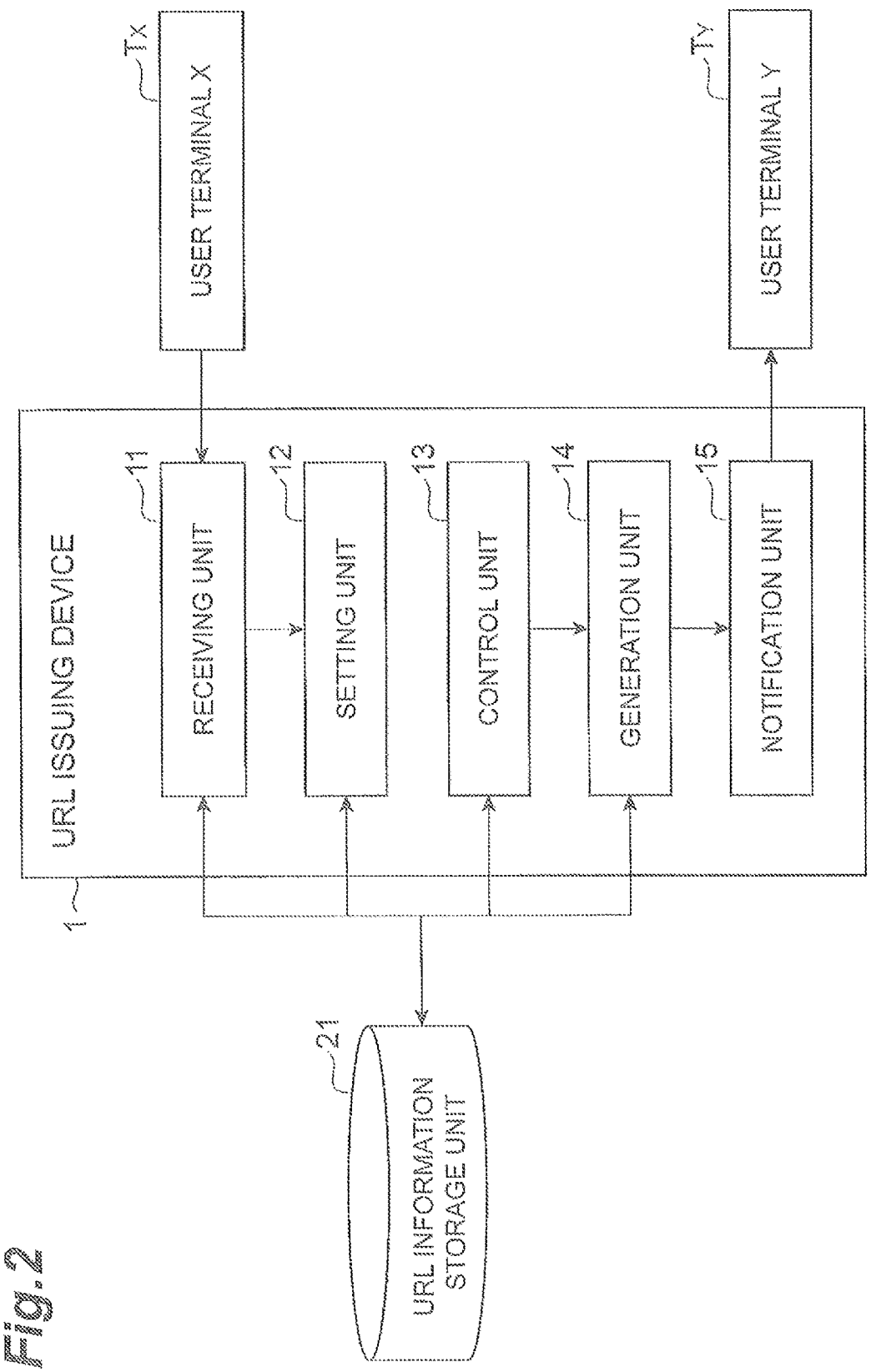
FIG. 2 is a block diagram showing a functional configuration of the URL issuing device.

FIG. 2 is a block diagram showing a functional configuration of the URL issuing device 1 according to this embodiment. The URL issuing device 1 is a device for issuing a URL that allows one or more target users to access information on a network. The URL issuing device 1 according to this embodiment is a device that receives a specification of a resource to be shared with a target user from the user X and issues a URL for accessing the resource to the target user, and thereby achieves resource sharing, and it is a computer such as a server, for example. Note that, although this embodiment assumes the case where the user X shares a resource such as a file or a folder with the user Y, it may be applied to the case of issuing a URL for activation when acquiring a new email account or the like, for example. In this case, the URL issuing device 1 does not need to include a receiving unit 11 (see FIG. 2), which is described later.

As shown in FIG. 2, the URL issuing device 1 according to this embodiment functionally includes a receiving unit 11 (receiving means), a setting unit 12 (control means), a control unit 13 (control means), a generation unit 14 (generation means), and a notification unit 15 (notification means). The functional units 11 to 15 of the URL issuing device 1 can access a URL information storage unit 20.

Figure 3:
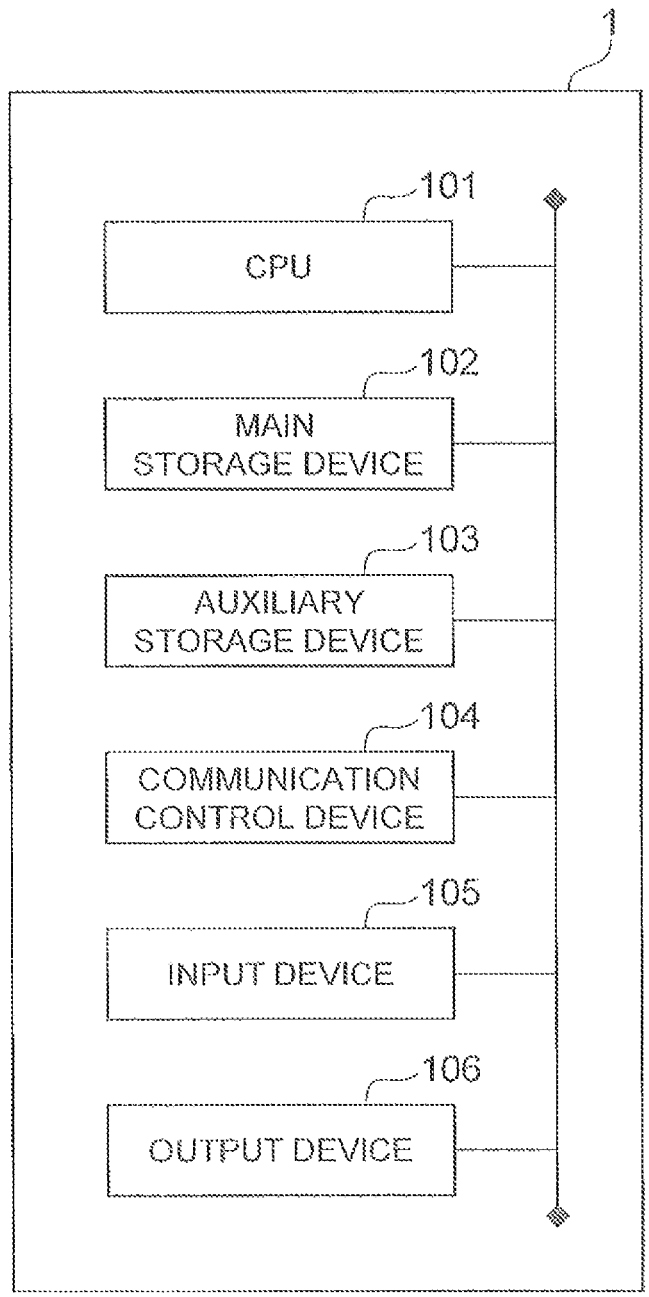
FIG. 3 is a view showing a hardware configuration of the URL issuing device.

FIG. 3 is a view showing a hardware configuration of the URL issuing device 1. As shown in FIG. 3, the URL issuing device 1 is physically configured as a computer system that includes a CPU 101, a main storage device 102 such as memory like RAM and ROM, an auxiliary storage device 103 such as a hard disk, a communication control device 104 such as a network card, an input device 105 such as a keyboard and a mouse, an output device 106 such as a display and the like.

The functions shown in FIG. 2 are implemented by loading given computer software (URL issuing program) onto hardware such as the CPU 101 or the main storage device 102 shown in FIG. 3, making the communication control device 104, the input device 105 and the output device 106 operate under control of the CPU 101, and performing reading and writing of data in the main storage device 102 or the auxiliary storage device 103. Data and database required for the processing is stored in the main storage device 102 or the auxiliary storage device 103.

The functional units of the URL issuing device 1 are described hereinafter. The receiving unit 11 is a part that receives a specification of a resource to be shared with the user terminal $T_Y$ of the user Y (target user) and a request for issuance of a URL for accessing the resource from the user terminal $T_X$ of the user X (one user). The specification of a resource may contain the name and attributes of a resource such as a file and information indicating a location on the network N, for example. The receiving unit 11 may further receive a specification of a target user, which is a user with whom the resource is to be shared. The specification of a target user may contain the address of a target user to which a URL is to be notified.

The URL for accessing a resource in this embodiment is a so-called one-time URL. To the one-time URL, an accessible period, which is a period during which access to the resource is possible, is set. The accessible period may start when the URL is notified to a user, for example.

Further, the receiving unit 11 can receive an update stop condition for stopping update of a URL (a specified condition set by a setting means) from the user terminal $T_X$ of the user X. Furthermore, the receiving unit 11 may receive a specification of an accessible period from the user terminal $T_X$ of the user X.

The setting unit 12 is a part that sets an update stop condition for stopping update of a URL that is notified to a target user. The update stop condition may be received by the receiving unit 11 or may be preset in the URL issuing device. The setting unit 12 stores the update stop condition into the URL information storage unit 20. Update of a URL and the update stop condition are described in detail later. Note that, although the setting unit 12 sets the update stop condition in this embodiment, it may be set as a preset value in the URL information storage unit 20. In this case, the URL issuing device 1 does not need to include the setting unit 12.

The control unit 13 is a part that controls the generation unit 14 to update the generated URL to a URL composed of a letter string different from that URL and then controls the notification unit 15 to notify the updated URL to a target user when the accessible period has elapsed before the update stop condition set by the setting unit 12 is satisfied.

The generation unit 14 is a part that generates a one-time URL under control of the control unit 13.

The notification unit 15 is a part that notifies the URL generated by the generation means to target users, which are one or more other users with whom the resource is to be shared.

Update of a URL and the update stop condition, control by the control unit 13, generation of a URL by the generation unit 14 and notification of a URL by the notification unit 15 are specifically described hereinafter with reference to FIGS. 4 to 6.

FIG. 4 is a view schematically showing the configuration of the URL information storage unit 20 and an example of data stored therein. As shown in FIG. 4(a), the URL information storage unit 20 stores an accessible period, an update stop condition, a request user and a target user in association with a URL generated by the generation unit 14 as shown in FIG. 4(a).

The URL is a one-time URL that contains information indicating a location of a resource whose specification is received by the receiving unit 11 on a network, and the URL generated by the generation unit 14 such as "http://AAA" is stored as shown in the figure, for example. In other words, the user terminal Y can access the resource to be shared through the URL "http://AAA".

The accessible period is a period during which access can be made to a resource using the URL, and the period "one day" is set as shown in the figure, for example. The accessible period is set to the URL information storage unit 20 by the setting unit 12.

The update stop condition is a condition for stopping update of a URL that is notified to a target user, and the condition "C1" is set as shown in the figure, for example. FIG. 4(b) is a view schematically showing an example of a table that stores a specific update stop condition. As shown in FIG. 4(b), the URL information storage unit 20 stores the condition that "until there is access to the URL" as the update stop condition "C1".

The request user is one user who has requested to share a resource with a target user, and who is an owner of the resource to be shared, for example. In the example shown in FIG. 4(a), the URL information storage unit 20 stores the data "user X" as "request user". The target user is another user with whom resource is to be shared, and the data "user $Y_A$" is stored as shown in the figure, for example.

Specifically, in the example shown in FIG. 4, when a specification of a resource to be shared with the user $Y_A$ from the user terminal $T_X$ of the user X is received by the receiving unit 11, the data "user X" and "user $Y_A$" are set as "request user" and "target user", respectively, to the URL information storage unit 20. The resource to be shared is previously uploaded to the URL issuing device 1, another server or the like by the user terminal $T_X$, for example, and information about the location of the resource is acquired by the URL issuing device 1.

Further, the setting unit 12 sets the update stop condition "until there is access to the URL" and the accessible period "one day" to the URL information storage unit 20 based on a specification by the user X through the receiving unit 11 or a preset value of the system including the URL issuing device 1.

Then, the generation unit 14 generates a one-time URL "http://AAA" containing information indicating the location of the resource to be shared and sets it to the URL information storage unit 20. When the location indicated by the one-time URL is in the URL issuing device 1, the generation unit 14 notifies the generated URL to a functional unit that manages access to the resource so as to enable access to the resource by accessing the URL. On the other hand, when the location indicated by the one-time URL is in a server for resource management other than the URL issuing device 1, the generation unit 14 notifies the generated URL to the server so as to enable access to the resource by accessing the URL.

After that, the notification unit 15 notifies the URL "http://AAA" set to the URL information storage unit 20 to the user terminal $T_{YA}$ of the user $Y_A$.

Based on the settings of the accessible period and the update stop condition in the URL information storage unit 20, the control unit 13 controls the generation unit 14 to generate a one-time URL and the notification unit 15 to notify the generated URL to a target user upon each lapse of one day until access to the URL stored in the URL information storage unit 20 from the user terminal $T_{YA}$ of the user $Y_A$ is detected. In this case, the control unit 13 can acquire the status of access to the URL from the user terminal $T_{YA}$ by communication with the server to be accessed or the like. Specifically, when access to the URL "http://AAA" from the user terminal $T_{YA}$ is not detected when one day has elapsed after the URL is notified to the user terminal $T_{YA}$, the control unit 13 controls the generation unit 14 to generate a one-time URL composed of a letter string different from the URL "http://AAA" and containing information indicating the location of the resource to be shared and update the URL in the URL information storage unit 20. Then, the control unit 13 controls the notification unit 15 to notify the updated URL to the user terminal $T_{YA}$. By this control, it is possible to allow the target user to access the resource without fail.

When access to the URL stored in the URL information storage unit 20 from the user terminal $T_{YA}$ is detected, the control unit 13 performs control to invalidate the URL that has been notified last time by the notification unit 15 so as to disable access to the resource. Specifically, when the location indicated by the one-time URL is in the URL issuing device 1, the control unit 13 causes a functional unit that manages access to the resource to perform control for invalidating the issued URL so as to disable access to the resource. On the other hand, when the location indicated by the one-time URL is in a server for resource management other than the URL issuing device 1, the control unit 13 causes the server to perform control for invalidating the issued URL so as to disable access to the resource. By this control, it is possible to reliably reduce the risk of access by other unspecified users.

A variation of the update stop condition is described hereinafter with reference to FIG. 5. FIG. 5(*a*) and FIG. 5(*b*) are views schematically showing the configuration of the URL information storage unit 20 and an example of data stored therein.

In the example shown in FIG. 5, when a specification of a resource to be shared with the users $Y_A$, $Y_8$ and $Y_C$ from the user terminal $T_X$ of the user X is received by the receiving unit 11, the data "user X" and "users $Y_A$, $Y_B$ and $Y_C$" are set as "request user" and "target user", respectively, to the URL information storage unit 20. Further, the setting unit 12 sets the update stop condition "C2" and the accessible period "two days" to the URL information storage unit 20 based on a specification by the user X through the receiving unit 11 or a preset value of the system including the URL issuing device 1. The update stop condition "C2" is "until an update stop instruction is received from the user X" as shown in FIG. 5(*b*).

The generation unit 14 generates a one-time URL "http://BBB" containing information indicating the location of the resource to be shared with the users $Y_A$, $Y_B$ and $Y_C$ and sets it to the URL information storage unit 20. After that, the notification unit 15 notifies the URL "http://BBB" set to the URL information storage unit 20 to the user terminal $T_{YA}$, $T_{YB}$ and $T_{YC}$ of the users $Y_A$, $Y_B$ and $Y_C$.

Based on the settings of the accessible period and the update stop condition in the URL information storage unit 20, the control unit 13 controls the generation unit 14 to generate a one-time URL and the notification unit 15 to notify the generated URL to a target user upon each lapse of two days until the URL update stop instruction from the user terminal $T_X$ of user X is received.

Specifically, when the URL update stop instruction from the user terminal $T_X$ is not received when two days have elapsed after the URL "http://BBB" is notified to the user terminals $T_{YA}$, $T_{YB}$ and $T_{YC}$, the control unit 13 controls the generation unit 14 to generate a one-time URL composed of a letter string different from the URL "http://BBB" and update the URL in the URL information storage unit 20. Then, the control unit 13 controls the notification unit 15 to notify the updated URL to the user terminals $T_{YA}$, $T_{YB}$ and $T_{YC}$. By this control, it is possible to share the resource with the target user while reducing the possibility that the resource is accessed by other unspecified users until the user X determines that it is no longer necessary to share the resource with the target user.

When an URL update stop instruction from the user terminal $T_X$ is received, the control unit 13 performs control to invalidate the URL notified by the notification unit 15 so as to disable access to the resource.

A variation of the update stop condition is described hereinafter with reference to FIG. 6. FIG. 6(*a*) and FIG. 6(*b*) are views schematically showing the configuration of the URL information storage unit 20 and an example of data stored therein.

Figure 6:
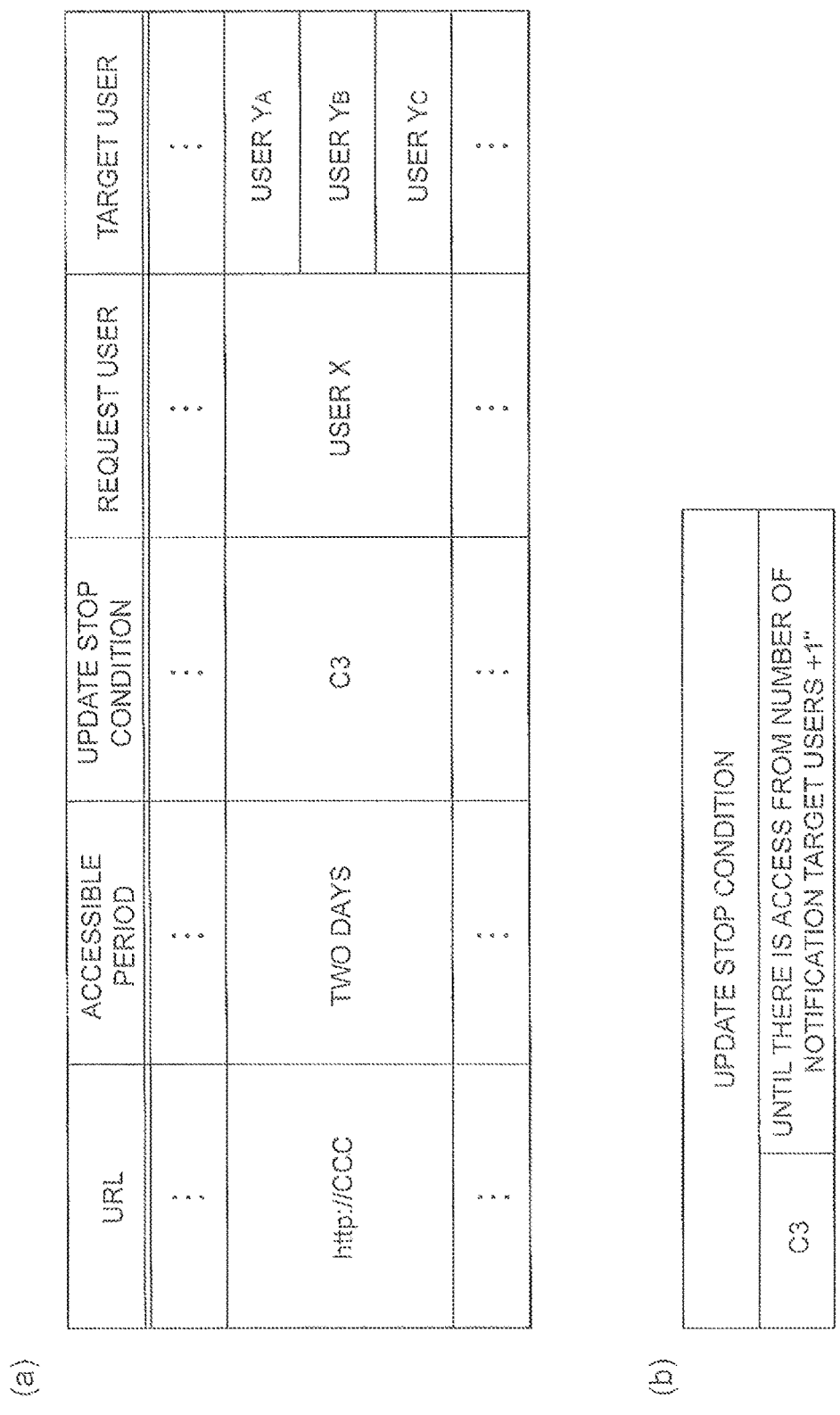
FIG. 6 is a view schematically showing a configuration of the URL information storage unit and an example of data stored therein.

In the example shown in FIG. 6, when a specification of a resource to be shared with the users $Y_A$, $Y_B$ and $Y_C$ from the user terminal $T_X$ of the user X is received by the receiving unit 11, the data "user X" and "users $Y_A$, $Y_B$ and $Y_C$" are set as "request user" and "target user", respectively, to the URL information storage unit 20. Further, the setting unit 12 sets the update stop condition "C3" and the accessible period "two days" to the URL information storage unit 20 based on a specification by the user X through the receiving unit 11 or a preset value of the system including the URL issuing device 1. The update stop condition "C3" is "until there is access from the number of notification target users+1" as shown in FIG. 6(*b*).

The generation unit 14 generates a one-time URL "http://CCC" containing information indicating the location of the resource to be shared with the users $Y_A$, $Y_B$ and $Y_C$ and sets it to the URL information storage unit 20. After that, the notification unit 15 notifies the URL "http://CCC" set to the URL information storage unit 20 to the user terminals $T_{YA}$, $T_{YB}$ and $T_{YC}$ of the users $Y_A$, $Y_B$ and $Y_C$.

Based on the settings of the accessible period and the update stop condition in the URL information storage unit 20, the control unit 13 controls the generation unit 14 to generate a one-time URL and the notification unit 15 to notify the generated URL to a target user upon each lapse of two days until access to the URL from four users, which are the total of three users, which is the number of notification target users, and additional one user, is detected. Note that the number of users who access the URL can be counted by the number of types of IP addresses and types of user agents contained in the access.

Specifically, when access to the URL from four users is not detected when two days have elapsed after the URL "http://CCC" is notified to the user terminals $T_{YA}$, $T_{YB}$ and $T_{YC}$, the control unit 13 controls the generation unit 14 to generate a one-time URL composed of a letter string different from the URL "http://CCC" and update the URL in the URL information storage unit 20. Then, the control unit 13 controls the notification unit 15 to notify the updated URL to the user terminals $T_{YA}$, $T_{YB}$ and $T_{YC}$. When access from users exceeding the number of target users is detected, it is highly probable that access to the URL is made from users other than the target users, and therefore it is possible to reduce the possibility of access by other unspecified users by this control.

When access to the URL from four users is detected, the control unit 13 performs control to invalidate the URL notified by the notification unit 15 so as to disable access to the resource.

Besides the update stop conditions described with reference to FIGS. 4 to 6, the setting unit 12 may set the condition that a one-time URL is updated a specified number of times as the update stop condition. By setting such an update stop condition, update of a URL and notification to a target user are repeated until the URL is updated a specified number of times, and it is thereby possible to extend the period during which the target user can make access while reducing the possibility of access by other unspecified users and prompting the target user to access the URL.

Figure 7:
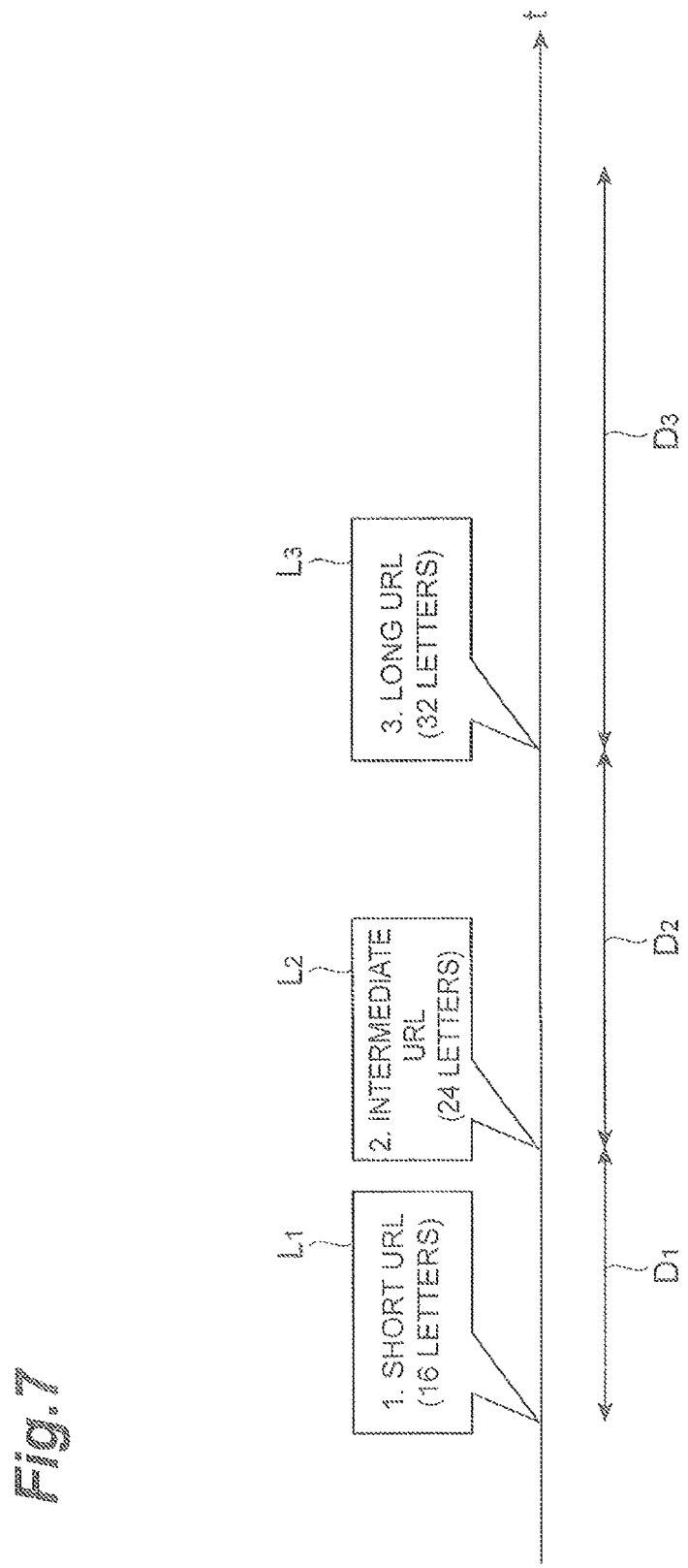
FIG. 7 is a view schematically showing a relationship between a letter string of a URL and an accessible period.

A variation of the embodiment in the generation of a URL by the generation unit 14 is described hereinafter with reference to FIGS. 7 and 8. Specifically, when updating a URL, the generation unit 14 can generate a URL composed of a letter string that is longer than a letter string of a URL before update and having an accessible period that is longer than the URL before update. FIG. 7 is a view schematically showing the relationship between a letter string of a URL and an accessible period. FIG. 8 is a view showing an example of data stored in the URL information storage unit 20 in the case where the URL shown in FIG. 7 is generated.

In the examples shown in FIGS. 7 and 8, the generation unit 14 first generates a one-time URL ($L_1$) "short URL" composed of a string of sixteen letters. The accessible period $D_1$ of this URL is set to "12 hours". The notification unit 15 notifies the one-time URL ($L_1$) "short URL" to the user terminals $T_{YA}$, $T_{YB}$ and $T_{YC}$ of the users $Y_A$, $Y_B$ and $Y_C$.

Next, when the accessible period $D_1$ "12 hours" has elapsed without satisfying the update stop condition "C4", the generation unit 14 generates a URL ($L_2$) "intermediate URL" composed of a string of twenty-four letters, which is longer than the URL ($L_1$). The accessible period $D_2$ of this URL is set to "24 hours", which is longer than the accessible period of the URL ($L_1$).

Further, when the accessible period $D_2$ "24 hours" has elapsed without satisfying the update stop condition "C4", the generation unit 14 generates a URL ($L_3$) "long URL" composed of a string of thirty-two letters, which is longer than the URL ($L_2$). The accessible period $D_3$ of this URL is set to "36 hours", which is longer than the accessible period of the URL ($L_2$).

In this embodiment, when updating a URL, the accessible period is set to a longer period than before update to thereby reduce the number of times of notifying the URL to the target user, and it is thus possible to save the target user from the bothersome task of receiving the URL. On the other hand, by setting a longer letter string to the URL with an increase in the accessible period, it is possible to reduce the possibility of recognition by other unspecified users, search engine robots and the like, and therefore an increase in the risk of access by other unspecified users caused by an increase in the period during which the resource can be accessed with the same URL can be cancelled out by setting a longer letter string to the URL. It is thereby possible to reduce the number of times of notifying a URL while preventing an increase in the risk of access by other unspecified users.

Figure 9:
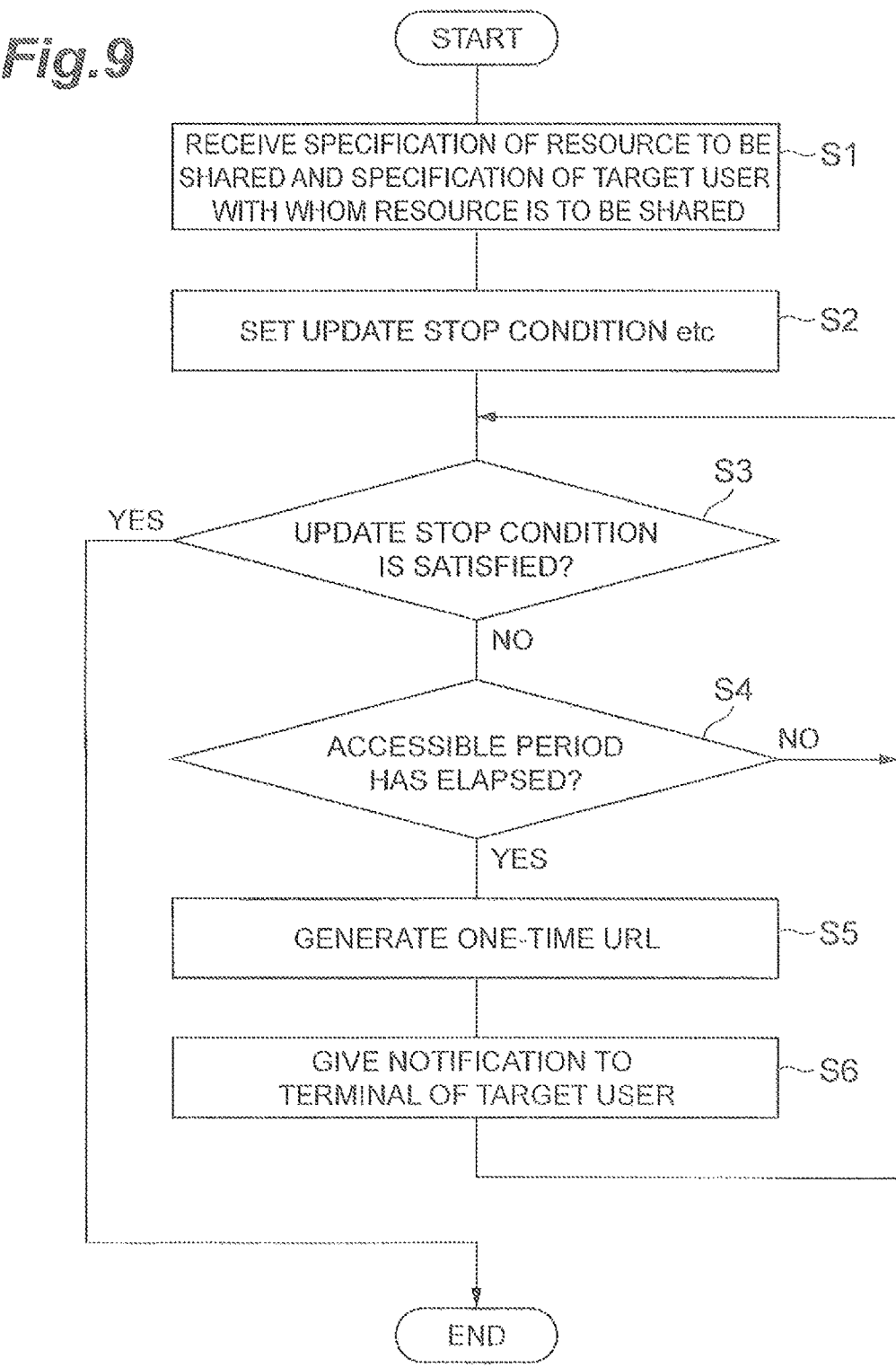
FIG. 9 is a flowchart showing an example of a process of a URL issuing method.

A URL issuing method according to this embodiment is described hereinafter with reference to FIG. 9. FIG. 9 is a flowchart showing an example of a process of a URL issuing method in the URL issuing device 1 shown in FIG. 2.

First, the receiving unit 11 receives a request for issuance of a URL for accessing a resource to be shared containing a specification of the resource and a specification of a target user with whom the resource is to be shared from a user terminal $T_X$ of a user X (one user) (S1). Next, the setting unit 12 sets an update stop condition to stop update of the URL to be notified to the target user, an accessible period and the like (S2).

Then, the control unit 13 determines whether the set update stop condition is satisfied or not (S3). When it is determined that the set update stop condition is satisfied, the process ends. The control unit 13 may perform control to invalidate the URL notified by the notification unit 15 so as to disable access to the resource. On the other hand, when it is not determined that the update stop condition is satisfied, the process proceeds to Step S4.

In Step S4, the control unit 13 determines whether the accessible period has elapsed (S4). When it is determined that the accessible period has elapsed, the process proceeds to Step S5. On the other hand, when it is not determined that the accessible period has elapsed, the process returns to Step S3.

In Step S5, the generation unit 14 generates a one-time URL allowing access to the resource to be shared (S5). Then, the notification unit 15 notifies the URL generated in Step S5 to the target user with whom the resource is to be shared (S6). After that, the process returns to Step S3.

Figure 10:
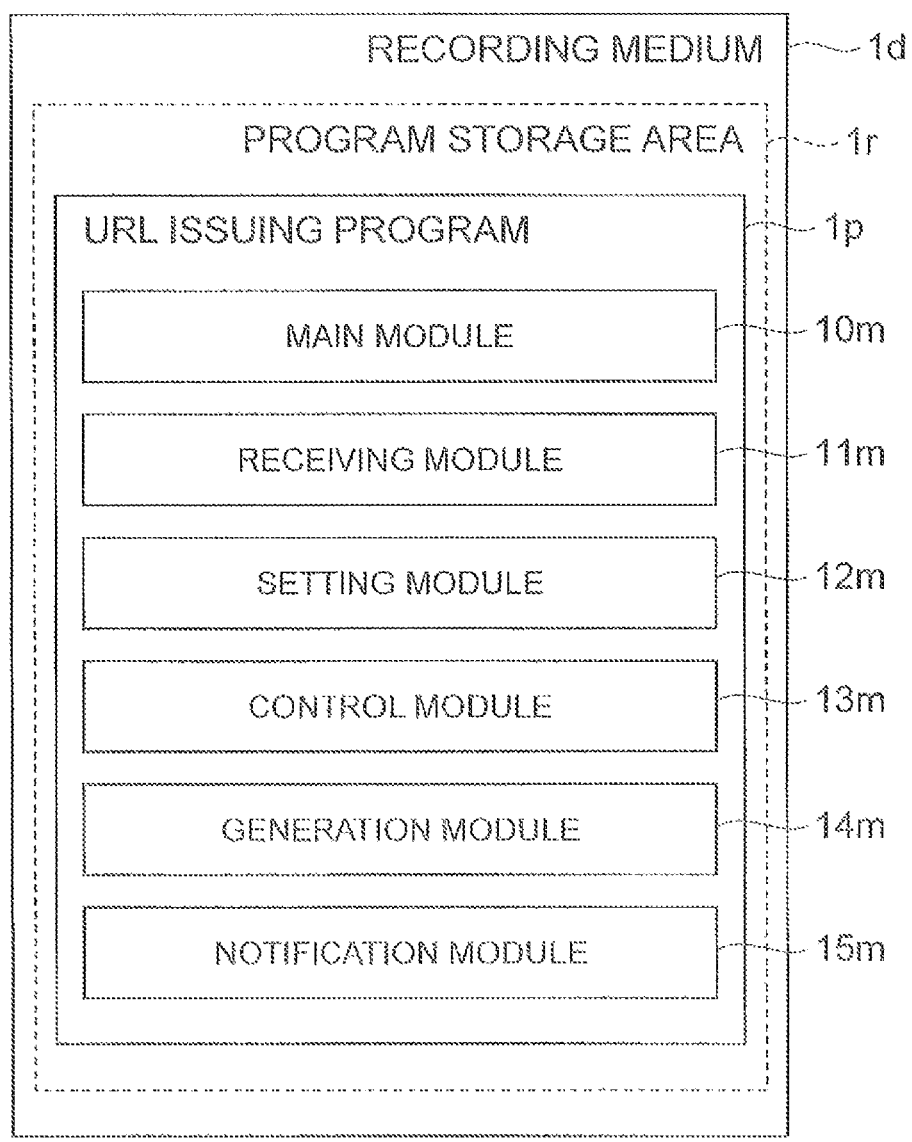
FIG. 10 is a view showing a configuration of a URL issuing program.

A URL issuing program that causes a computer to function as the URL issuing device 1 is described hereinafter with reference to FIG. 10. A URL issuing system 1*p* includes a main module 10*m*, a receiving module 11*m*, a setting module 12*m*, a control module 13*m*, a generation module 14*m*, and a notifying module 15*m*.

The main module 10*m* is a part that exercises control over the URL issuing processing. The functions implemented by executing the receiving module 11*m*, the setting module 12*m*, the control module 13*m*, the generation module 14*m* and the notifying module 15*m* are respectively equal to the functions of the receiving unit 11, the setting unit 12, the control unit 13, the generation unit 14 and the notification unit 15 of the URL issuing device 1 shown in FIG. 2.

The URL issuing system 1*p* is provided through a recording medium 1*d* such as CD-ROM or DVD-ROM or semiconductor memory, for example. Further, the URL issuing system 1*p* may be provided as a computer data signal superimposed onto a carrier wave over a communication network.

According to the URL issuing device, the URL issuing method and the URL issuing program described above, a URL allowing access to a resource to be shared is updated to a URL which is different from a URL that has been already generated, and the updated URL is notified to a target user until an update stop condition is satisfied, and therefore, by extending the period during which the target user can make access by update and re-notification of the URL and limiting the period during which access can be made with the same URL to a certain period, it is possible to reduce the possibility of access by other unspecified users. Further, each time the URL is updated, the updated URL is notified to the target user, and therefore it is possible to prompt the target user to access the resource to be shared.

An embodiment of the present invention is described in detail above. However, the present invention is not limited to the above-described embodiment. Various changes and modifications may be made to the present invention without departing from the scope of the invention. The URL issuing device 1 according to this embodiment may be applied to a system that shares a resource such as a blog or an album with friends and allows them to view it, for example. Further, it may be applied to a system that, in a used goods buying service on a network, uploads a license image or the like of a user as a resource to a specified server and lets a store that buys used goods to refer to the license image.

Note that, although the case where a URL is notified to the user Y different from the user X based on a request for issuance of a URL from the user X is described in the above embodiment, the present invention is applicable to the case of issuing a URL for activation when acquiring a new email account or the like as described above. In this case, the receiving unit 11 does not need to be included in the URL issuing device 1, and the control unit 13 controls processing to issue a URL for activation to a target user who creates a new email account without need for a URL issuance request from a specific user such as the user X.

REFERENCE SIGNS LIST

1 . . . URL issuing device, 11 . . . receiving unit, 12 . . . setting unit, 13 . . . control unit, 14 . . . generation unit, 15 . . . notification unit, 20 . . . URL information storage unit, 1d . . . storage medium, 1p . . . URL issuing program, 10m . . . main module, 11m . . . receiving module, 12m . . . setting module, 13m . . . control module, 14m . . . generation module, 15m . . . notification module, 100 . . . URL issuing system, N . . . network, $T_X$, $T_Y$, $T_{YA}$, $T_{YB}$, $T_{YC}$ . . . user terminal

The invention claimed is:

1. A system for issuing a URL comprising:
a first user terminal that transmits a specification of a resource to a URL issuing device on a network; and
at least one target user terminal that receives the specification of the resource from the URL issuing device on the network, the URL issuing device comprising:
at least one memory operable to store computer program instructions; and
at least one processor operable to access said program instructions in said at least one memory, and operate according to said program instructions, said program instructions including:
generation instructions configured to cause at least one of said at least one processor to generate a URL containing information indicating a location of information to be accessed by one or more target users using the at least one target user terminal on the network, an accessible period during which the information is accessible being set to the URL;
notification instructions configured to cause at least one of said at least one processor to notify the URL generated to the target user; and
control instructions configured to cause at least one of said at least one processor to update the generated URL to a URL composed of a different letter string from the generated URL, and to repeatedly notify the updated URL to the target user when the accessible period has elapsed before a specified condition for stopping update of the URL is satisfied.

2. The system according to claim 1, further comprising:
receiving instructions configured to cause at least one of said at least one processor to receive the specification of the resource to be shared with the target user from one user, wherein
the generation instructions are further configured to cause at least one of said at least one processor to generate a URL containing information indicating a location of the resource on the network.

3. The system according to claim 2, wherein
the specified condition is receiving of an instruction indicating stop of URL update and notification from the one user.

4. The system according to claim 1, wherein
the specified condition is detection of access to the notified URL by the target user.

5. The system according to claim 1, wherein
the specified condition is update of the URL a specified number of times.

6. The system according to claim 1, wherein
the specified condition is detection of access to the notified URL by users exceeding the number of target users.

7. The system according to claim 1, wherein
when updating a URL, the generation instructions cause at least one of said at least one processor to generate a URL composed of a longer letter string than a URL before update and having a longer accessible period than the URL before update.

8. The system according to claim 1, wherein
when the specified condition is satisfied, the control instructions cause at least one of said at least one processor to invalidate the URL notified last time by the notification instructions so as to disable access to the information.

9. A URL issuing method comprising:
transmitting a specification of a resource to a URL issuing device on a network;
receiving the specification of the resource from the URL issuing device on the network;
generating a URL containing information indicating a location of information to be accessed by one or more target users on the network, an accessible period during which the information is accessible being set to the URL;
notifying the URL generated to the target user;
repeating an update of updating the generated URL to a URL composed of a different letter string from the generated URL; and
repeatedly notifying the URL updated to the target user when the accessible period has elapsed before a specified condition for stopping update of the URL is satisfied.

* * * * *